Aug. 13, 1957  B. E. MARCUS  2,802,347
AUTOMOBILE AIR COOLING DEVICE
Filed July 9, 1954

INVENTOR.
BEN E. MARCUS.
BY Fulwider, Mattingly
and Huntley
ATTORNEYS.

United States Patent Office 2,802,347
Patented Aug. 13, 1957

2,802,347

AUTOMOBILE AIR COOLING DEVICE

Ben E. Marcus, Blythe, Calif., assignor of one-half to Clair Hayes and one-half to Martha Hayes, both of Long Beach, Calif.

Application July 9, 1954, Serial No. 442,308

1 Claim. (Cl. 62—133)

The present invention relates generally to air cooling devices and more particularly to a novel and improved air cooling device for use with an automobile.

There have been heretofore proposed various types of air cooling devices for cooling the passenger compartment of an automobile. The most efficient of these devices utilize minature power-operated refrigerating systems that are complex in structure, extremely costly and quite heavy. Moreover, because of their relative complexity they are expensive to service and maintain. Air cooling devices of the evaporative cooling type also find wide use for cooling automobiles. Although devices of the latter type are comparatively inexpensive, they tend to saturate the air inside of the automobile's passenger compartment to such a degree that the automobile's occupants are made uncomfortable. Additionally, where these devices are of the type which are mounted adjacent a window they obstruct the view of the automobile's occupants. Where they are the type that are disposed within the passenger compartment of the automobile they reduce the amount of space therein available to the passengers.

It is a major object of the present invention to provide a new and improved air cooling device for use with automobiles.

Another object is to provide an air cooling device which is simple in design and rugged of construction whereby it may afford a long and useful service life.

A further object is to provide a device of the aforedescribed nature which may be mounted within the trunk compartment of a conventional automobile so as to be completely out of sight. Inasmuch as it is disposed within the trunk compartment it does not reduce the amount of space available within the passenger compartment of the automobile.

A still further object of the invention is to provide a device of the aforedescribed nature which may be sold at a comparatively low price and which will not require other than minor inexpensive maintenance during its service life.

An additional object of the invention is to provide an air cooling device for automobiles which will not tend to saturate the air within the automobile's passenger compartment.

Yet another object of the invention is to provide a device of the aforedescribed nature which utilizes ordinary ice as its cooling medium.

Figure 1:
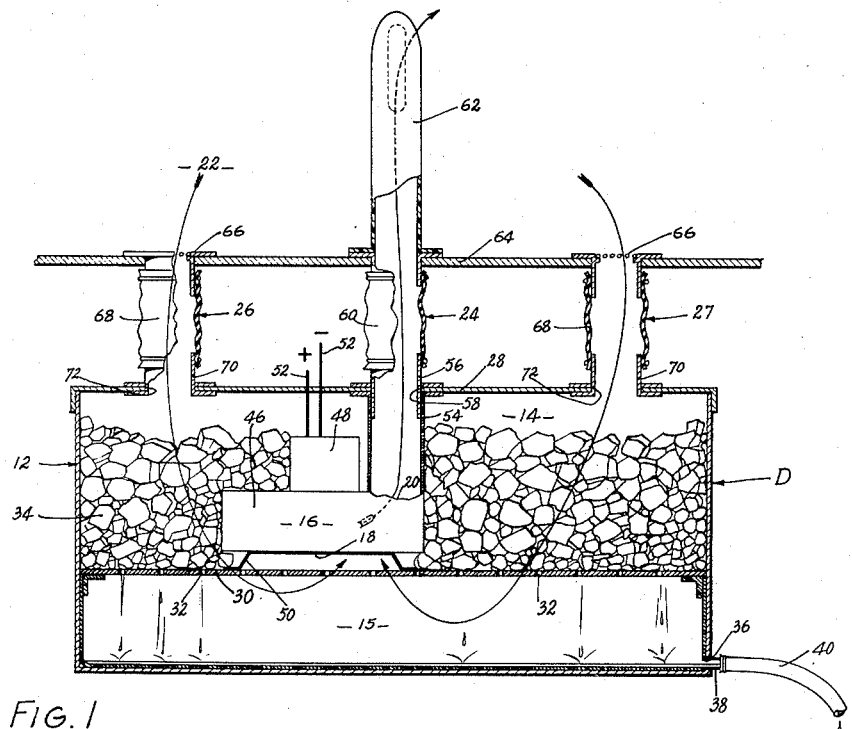
Figure 2:
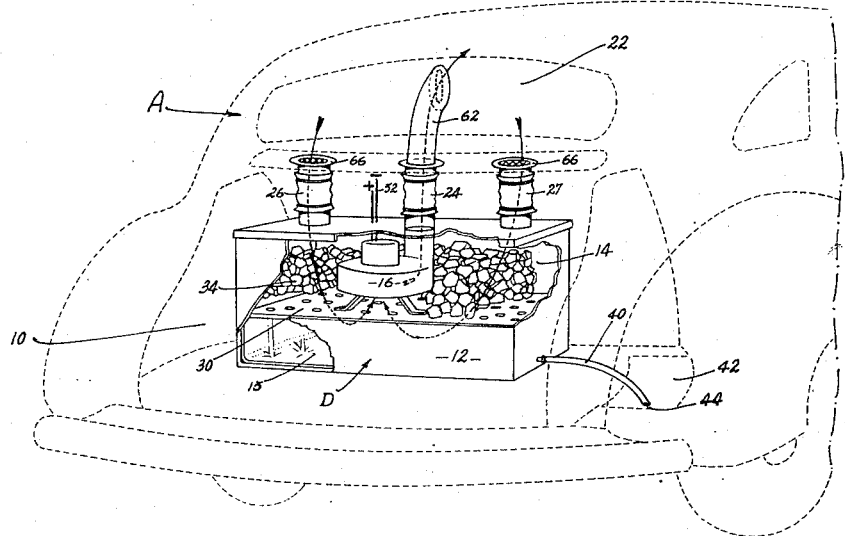

These and other objects and advantages of the present invention will become more apparent from the following detailed description of the preferred embodiment thereof, when taken in conjunction with the appended drawings wherein:

Figure 1 is a vertical sectional view of a preferred form of automobile cooling device embodying the present invention; and Figure 2 is a generally schematic viewing of said device installed in an automobile.

Referring to the drawings, the preferred form of automobile air cooling device D embodying the present invention is shown mounted within the trunk compartment 10 of a conventional automobile A. The device D includes a housing, generally designated 12, having an ice-receiving chamber 14 formed in the upper portion and a cooled-air chamber 15 formed in its lower portion. Mounted within the ice-receiving chamber 14 is an electric blower 16. The intake 18 of this blower is in communication with the cooled-air chamber 15 while its outlet 20 is in communication with the passenger compartment 22 of the automobile by means of a conduit 24. A pair of conduits 26 and 27 connect the passenger compartment 22 with the upper portion of the ice-receiving chamber.

More particularly, the housing 12 is generally rectangular in shape and may be formed from suitable material, such as wood or metal. Preferably, it will be covered with an insulating material. A cover 28 is provided for its upper end, which cover may be removable with respect to the housing. The ice-receiving chamber 14 and the cooled-air chamber 15 are defined by a horizontal wall 30 which is formed with a plurality of small openings or apertures 32. A quantity of chipped ice 34 is shown disposed within the ice-receiving chamber 14. In order to permit the water formed when the ice 34 melts to escape from the cooled-air chamber 15, the lower end thereof is formed with a bore 36 wherein is disposed a short length of pipe 38. A piece of flexible hose 40 extends from the pipe 38 to the spare tire well 42 of the automobile. The bottom of this well is formed with an aperture 44 which permits water from the hose 40 to escape.

The electric blower 16 will preferably be of the centrifugal type and includes a case 46 upon which is mounted an electric motor 48. The case is rigidly secured to the upper surface of the wall 30 by means of suitable metal brackets 50. Electric conduits 52 extend from the electric motor 48 to the electrical system of the automobile. The blower outlet 20 is conected to a short length of tubing 54 having its opposite end secured to a sleeve element 56 which is disposed within a bore 58 formed in the housing's cover 28. Another length of flexible tubing 60 connects the sleeve element 56 with a suitable outlet nozzle 62 mounted by the central portion of the rear deck 64 of the automobile. The opposite sides of the rear deck 64 support each a return grill 66. The return grills 66 are each connected to the upper end of a piece of flexible tubing 68. The lower end of the latter pieces of tubing are connected to sleeve 70 that are extended through bores 72 formed in the housing's cover 28.

In operation, the cover 28 may be removed from the housing 12 and ice 34 positioned within the ice-receiving chamber 14. This ice 34 in melting reduces the temperature of the air within the housing 12. When the electric motor 48 is energized the blower 16 will serve to force the cooled air from within the housing through the tubing 54 and 60 into the passenger compartment 22 of the automobile. Simultaneously, the pieces of tubing 68 will serve as return conduits from the passenger compartment for transferring the air therewithin into the upper portion of the ice-receiving chamber 14. The air from within the passenger compartment will be cooled by the ice 34 and drop into the cooled-air chamber 15 so as to be drawn into the blower inlet 18. In this manner the air disposed within the passenger compartment 22 will be constantly recirculated through the housing 12 in heat-transfer relationship, as indicated by the directional arrows in the drawings.

While there has been shown and described what is presently believed to be the preferred embodiment of the present invention it will be apparent that various modifications and changes may be made thereto without departing from the spirit of the invention or the scope of the following claim.

I claim:

An air cooling device for use with an automobile having a trunk that includes a spare tire well formed with a drain hole, and a passenger compartment formed with a rear deck, comprising: a generally rectangular housing disposable within said trunk; a removable cover for said housing; a horizontal wall disposed within said housing, said wall being spaced above the bottom closure of said housing so as to define an ice-receiving chamber in the upper portion of said chamber and a cooled-air chamber in the lower portion thereof, said wall being formed with openings; a bore formed in the lower end of one sidewall of said housing; a pipe disposed within said bore; a flexible hose extending from said pipe to said spare tire well; a centrifugal blower having a case formed with an intake and a discharge, and an electric motor that is energized by the electrical system of said automobile; bracket means securing the case of said blower to said wall; an outlet nozzle mounted at the center of the rear deck of said automobile and a pair of return grills mounted at opposite sides of said rear deck; a conduit connecting the discharge of said blower to said outlet nozzle; and a pair of conduits connecting the upper portion of said housing with said return grills, the intake of said blower being in communication with said cooled-air chamber.

References Cited in the file of this patent

UNITED STATES PATENTS

| 2,294,036 | Kettering | Aug. 25, 1942 |
| 2,480,510 | Roper | Aug. 30, 1949 |

FOREIGN PATENTS

| 851,526 | France | Oct. 2, 1939 |